No. 687,529. Patented Nov. 26, 1901.
A. A. HOYT.
TREE SUPPORT.
(Application filed June 18, 1901.)
(No Model.)

Witnesses, Inventor,

UNITED STATES PATENT OFFICE.

ASA A. HOYT, OF WATSONVILLE, CALIFORNIA.

TREE-SUPPORT.

SPECIFICATION forming part of Letters Patent No. 687,529, dated November 26, 1901.

Application filed June 18, 1901. Serial No. 65,002. (No model.)

*To all whom it may concern:*

Be it known that I, ASA A. HOYT, a citizen of the United States, residing at Watsonville, county of Santa Cruz, State of California, have invented an Improvement in Tree-Supports; and I hereby declare the following to be a full, clear, and exact description of the same.

My invention relates to an improvement in devices for supporting the limbs of fruit-laden trees.

It consists of the improved tree-support, which I shall hereinafter describe and claim.

Figure 1:
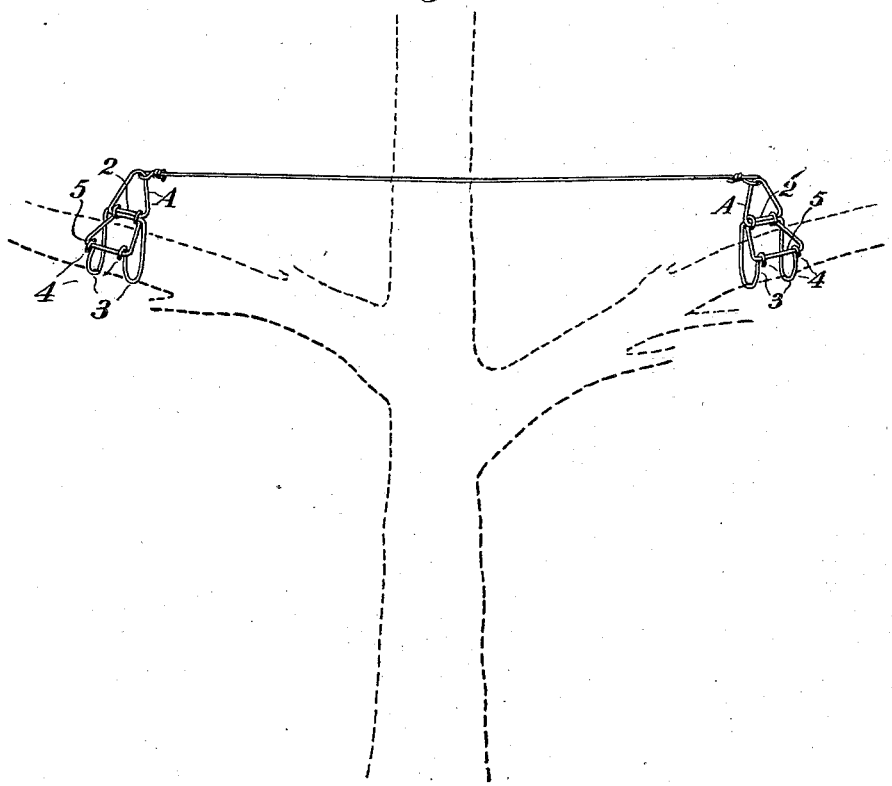
Figure 2:
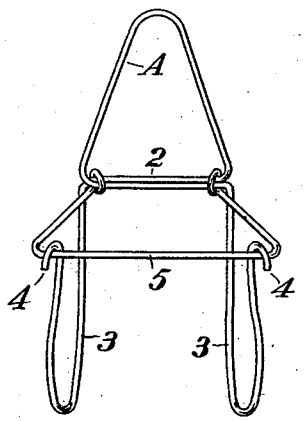

Having reference to the accompanying drawings, Figure 1 is a perspective view of my invention, illustrating its application. Fig. 2 is a front view of a limb-support.

With fruit-trees, especially prolific bearers, like apples, peaches, and the like, much difficulty is experienced year after year in supporting the drooping limbs, and often the latter break from the weight of fruit carried thereon. It is generally customary to prop up these limbs by means of poles having one end resting upon the ground. These props offer a more or less extended surface for the limb to chafe upon, furnish a lodging for insects, and often are blown down by the wind, whereupon damage occurs by the breaking of the limb.

My hook consists of a single piece of spring-wire, bent centrally upon itself to form the handle A. The two ends are then bent to lie contiguous to each other to form the horizontal portion 2. The ends are again bent at right angles to form the separate hook members or jaws 3, each of the latter terminating in an obversely-curved portion or hook 4. To the horizontal portion 2 is secured a locking-bail 5, which is adapted to engage the hooks 4.

In operation one of these supports is placed upon a limb and the other attached to another limb on the opposite side of the tree. This is simply done by hooking the members 3 around the limb and then locking down the bail 5. The handles 2 are then connected by a rope or wire, and by simply drawing them together the ends of the limbs are raised as desired, the limbs and the connecting-wire forming, as it were, a triangle whose apex is below its base.

The separated hook members furnish a sufficiently strong support for the limb, do not seriously chafe the tree, as the wooden props do, and offer no hiding-place for insects.

The locking-bail absolutely prevents the hooks from falling off or being affected by the wind, and thus causing the limbs to drop down and break.

As these supports are preferably made of galvanized wire, they will not be subject to deterioration by remaining on the trees during winter. They offer no hindrance to pruning, and a tree properly supported need not be attended to further in this direction for three or four seasons. The tree is thus preserved continually in its natural shape. At the same time these supports are readily removable at any time, as after picking.

If desired, the hook members 3 may have interposed between them and the limb a piece of asbestos-paper, leather, or the like to prevent abrasion of the bark, though as a matter of practice this is not ordinarily found necessary.

Having thus described my invention, what I claim as new, and desire to secure by Letters Patent, is—

1. In a means for supporting the limbs of trees, a wire hook having two members or jaws and a bail adapted to engage the ends of and inclose the limb within said jaws.

2. A tree-support consisting of a hook having two separated hook members, the ends of said members obversely curved and a bail adapted to engage the ends of said members.

In witness whereof I have hereunto set my hand.

ASA A. HOYT.

Witnesses:
W. R. PORTER,
H. HOYT.